United States Patent [19]

Coffinberry

[11] Patent Number: 5,392,614
[45] Date of Patent: Feb. 28, 1995

[54] GAS TURBINE ENGINE COOLING SYSTEM

[75] Inventor: George A. Coffinberry, West Chester, Ohio

[73] Assignee: General Electric Company, Cincinnati, Ohio

[21] Appl. No.: 6,417

[22] Filed: Jan. 21, 1993

Related U.S. Application Data

[63] Continuation-in-part of Ser. No. 856,318, Mar. 23, 1992, Pat. No. 5,036,768.

[51] Int. Cl.$^6$ .............................................. F25D 9/00
[52] U.S. Cl. .......................................... 62/402; 62/87
[58] Field of Search ................................... 62/87, 402

[56] References Cited

U.S. PATENT DOCUMENTS

| | | | |
|---|---|---|---|
| 2,970,437 | 2/1961 | Anderson | 60/39.66 |
| 4,254,618 | 3/1981 | Elovic | 60/226 R |
| 4,461,154 | 7/1984 | Allan | 62/402 |
| 4,539,816 | 9/1985 | Fox | 62/402 |
| 5,036,678 | 8/1991 | Renninger et al. | 62/402 |
| 5,056,335 | 10/1991 | Renninger et al. | 62/402 |

FOREIGN PATENT DOCUMENTS

| | | |
|---|---|---|
| 564135A2 | 10/1993 | European Pat. Off. |
| 1453611 | 10/1976 | United Kingdom |
| 9012204 | 10/1990 | WIPO |

*Primary Examiner*—Ronald C. Capossela
*Attorney, Agent, or Firm*—Jerome C. Squillaro; Nathan D. Herkamp

[57] ABSTRACT

A gas turbine engine cooling system. Hotter engine compressor air is cooled by a heat exchanger using a colder engine fluid (such as fuel or lower pressure (colder) engine compressor air. The cooled air passes through the compressor section of an auxiliary turbocompressor and is used to cool the engine high pressure turbine. Some of the cooled air (or uncooled discharge air from the engine high pressure compressor) is used to drive the turbine section of the turbocompressor. The spent air exiting the turbine section of the turbocompressor is used to help cool the engine low pressure turbine.

10 Claims, 7 Drawing Sheets

GAS TURBINE ENGINE COOLING SYSTEM

This is a continuation-in-part of application Ser. No. 07/856,318, filed Mar. 23, 1992, now U.S. Pat. No. 5,036,768.

BACKGROUND OF THE INVENTION

The present invention relates generally to gas turbine engines, and more particularly to a system for cooling such an engine.

Gas turbine engines (such as turbojet engines, bypass turbofan engines, turboprop engines, turboshaft engines, etc.) may be used to power flight vehicles (such as planes, helicopters, and missiles, etc.) and may also be used to power ships, tanks, electric power generators, pipeline pumping apparatus, etc. For purposes of illustration, the invention will be described with respect to an aircraft bypass turbofan gas turbine engine. However, it is understood that the invention is equally applicable to other types and/or uses of gas turbine engines.

A gas turbine engine includes a core engine having, in serial flow relationship, high pressure compressor (also called a core compressor) to compress the airflow entering the core engine, a combustor in which a mixture of fuel and the compressed air is burned to generate a propulsive gas flow, and a high pressure turbine which is rotated by the propulsive gas flow and which is connected by a larger diameter shaft to drive the high pressure compressor. A typical aircraft bypass turbofan gas turbine engine adds a low pressure turbine (located aft of the high pressure turbine) which is connected by a smaller diameter coaxial shaft to drive a front fan (located forward of the high pressure compressor) which is surrounded by a nacelle and which may also drive a low pressure compressor (located between the front fan and the high pressure compressor). The low pressure compressor sometimes is called a booster compressor or simply a booster. It is understood that the term "compressor" includes, without limitation, high pressure compressors and low pressure compressors. A flow splitter, located between the fan and the first (usually the low pressure) compressor, separates the air which exits the fan into a core engine airflow and a surrounding bypass airflow. The bypass airflow from the fan exits the fan bypass duct to provide most of the engine thrust for the aircraft. Some of the engine thrust comes from the core engine airflow after it flows through the low and high pressure compressors to the combustor and is expanded through the high and low pressure turbines and accelerated out of the exhaust nozzle.

Aircraft bypass turbofan gas turbine engines are designed to operate at high temperatures to maximize engine thrust. Cooling of engine hot section components (such as the combustor, the high pressure turbine, the low pressure turbine, and the like) is necessary because of the thermal "redline" limitations of the materials used in the construction of such components. Typically such cooling of a portion of the engine is accomplished by ducting (also called "bleeding") cooler air from the high and/or low pressure compressors to those engine components which require such cooling. Unfortunately the relatively low pressure and hot temperature of the compressor air limits its ability to be used to cool such engine components.

SUMMARY OF THE INVENTION

It is an object of the invention to provide a system for improved cooling of the hot section components and other portions of a gas turbine engine.

In a preferred embodiment, the invention provides a system for cooling first and second portions (such as the high and low pressure turbines) of a gas turbine engine and includes a turbocompressor and a first heat exchanger. The first heat exchanger has an inlet and an outlet for a first fluid flow providing cooling to the first heat exchanger and has an inlet and an outlet for a second airflow receiving cooling from the first heat exchanger. The first fluid flow inlet is in fluid communication with lower temperature fluid (e.g., lower pressure and temperature discharge air from the booster compressor section of the engine compressor). The second airflow inlet is in fluid communication with higher temperature air from the engine compressor (e.g., higher pressure and temperature discharge air from the high pressure compressor section of the engine compressor). The second airflow outlet is in fluid communication with the inlet of the compressor section of the turbocompressor. The outlet of the compressor section of the turbocompressor is in fluid communication with the first portion of the engine requiring cooling and the outlet of the turbine section of the turbocompressor is in fluid communication with the second portion of the engine requiring cooling.

Preferably, the inlet of the turbine section of the turbocompressor is in fluid communication with either the higher temperature air from the engine compressor or the second airflow outlet of the first heat exchanger.

Several benefits and advantages are derived from the gas turbine engine cooling system of the invention. Use of the turbocompressor and heat exchanger of the invention permit higher pressure and lower temperature air to be used for cooling portions of the engine such as engine hot section components. Maximum engine thrust, which is especially important during takeoff and climb, can be increased for a particular "redline" temperature limit for the engine hot section components by using the higher pressure and lower temperature cooling air of the invention, as can be appreciated by those skilled in the art. In a preferred embodiment of the invention, a single heat exchanger is used to cool two portions of the engine.

BRIEF DESCRIPTION OF THE DRAWINGS

The accompanying drawings illustrate several embodiments of the present invention wherein.

In the drawings, like reference numerals designate identical or corresponding parts throughout the respective figures.

DETAILED DESCRIPTION OF THE INVENTION

Figure 1:
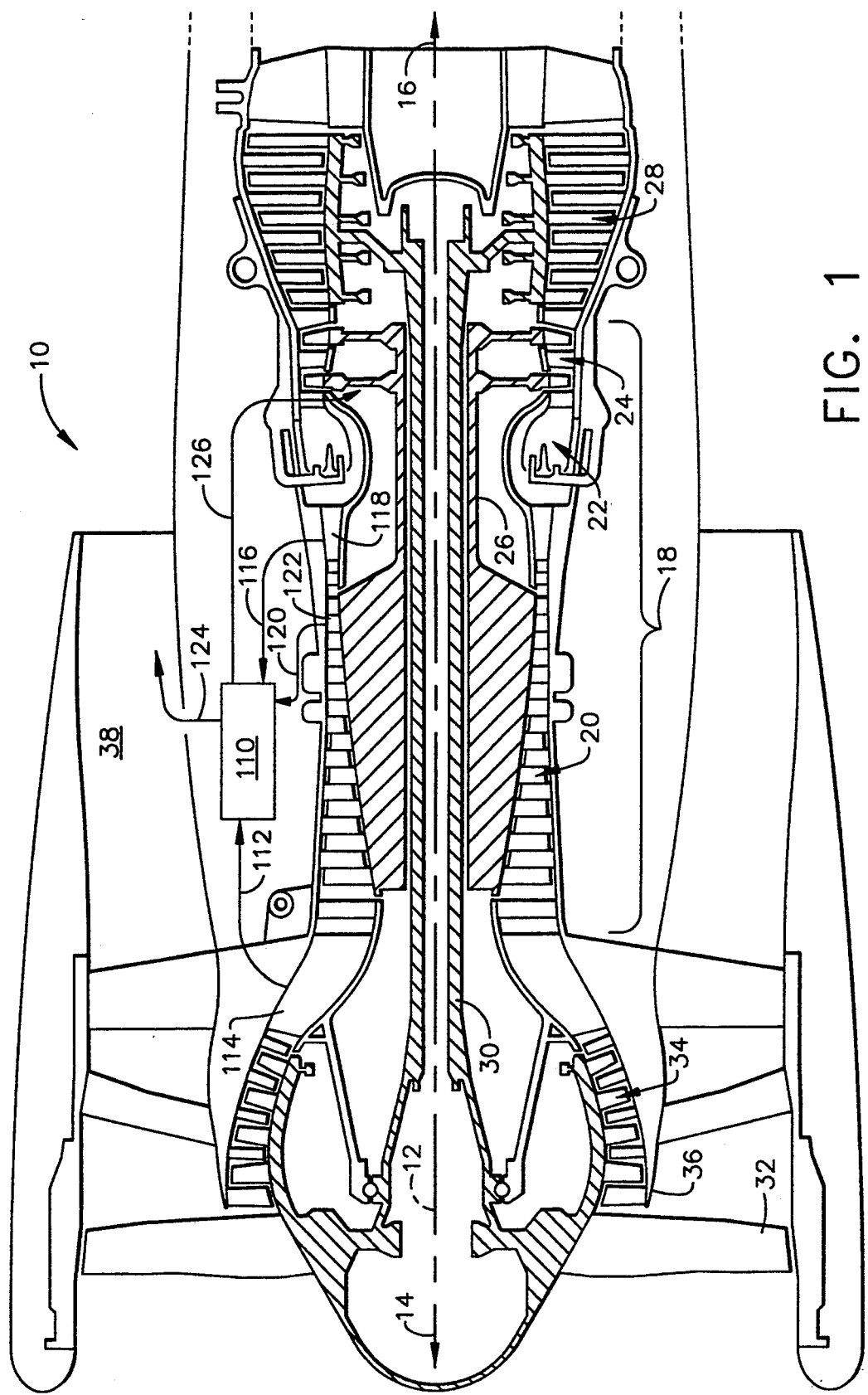
FIG. 1 is a schematic side view of an aircraft bypass turbofan gas turbine engine (with the exhaust nozzle omitted for clarity) which employs the engine cooling system of the invention to cool a high pressure turbine portion of the engine.

Referring now to FIG. 1, there is illustrated an aircraft bypass turbofan gas turbine engine 10 having a generally longitudinally extending axis or centerline 12 and generally extending forward 14 and aft 16. The bypass turbofan engine 10 includes a core engine (also called a gas generator) 18 which comprises a high pressure compressor or core compressor 20, a combustor 22, and a high pressure turbine 24, all arranged in a serial, axial flow relationship. A larger diameter annular drive shaft 26, disposed coaxially about the centerline 12 of the engine 10, fixedly interconnects the high pressure compressor 20 and the high pressure turbine 24.

The core engine 18 is effective for generating combustion gases. Pressurized air from the high pressure compressor 20 is mixed with fuel in the combustor 22 and ignited, thereby generating combustion gases. Some work is extracted from these gases by the high pressure turbine 24 which drives the high pressure compressor 20. The combustion gases are discharged from the core engine 18 into a low pressure or power turbine 28. The low pressure turbine 28 is fixedly attached to a smaller diameter annular drive shaft 30 which is disposed coaxially about the centerline 12 of the engine 10 within the larger diameter annular drive shaft 26. The smaller diameter annular drive shaft 30 rotates a forward row of fan rotor blades 32. The smaller diameter annular drive shaft 30 also rotates a low pressure compressor 34 (also called a booster compressor or simply a booster). A flow splitter 36, located between the fan blades 32 and the low pressure compressor 34, separates the air which exits the fan into a core engine airflow which exits the exhaust nozzle (not shown) and a surrounding bypass airflow which exits the fan bypass duct 38.

FIG. 1 shows a first application of the engine cooling system 110 of the invention used for cooling a first portion of the engine 10, wherein the first portion comprises the high pressure turbine 24. The cooling system 110 receives air: from a duct 112 which bleeds air from the low pressure compressor discharge region 114; from a duct 116 which bleeds air from the high pressure compressor discharge region 118; and from a duct 120 which bleeds air from a region 122 in between such low and high pressure compressor discharge regions 114 and 118. The cooling system 110 discharges air: to a duct 124 which routes air to the fan bypass duct 38; and to a duct 126 which routes air to the high pressure turbine 24 region.

Figure 2:
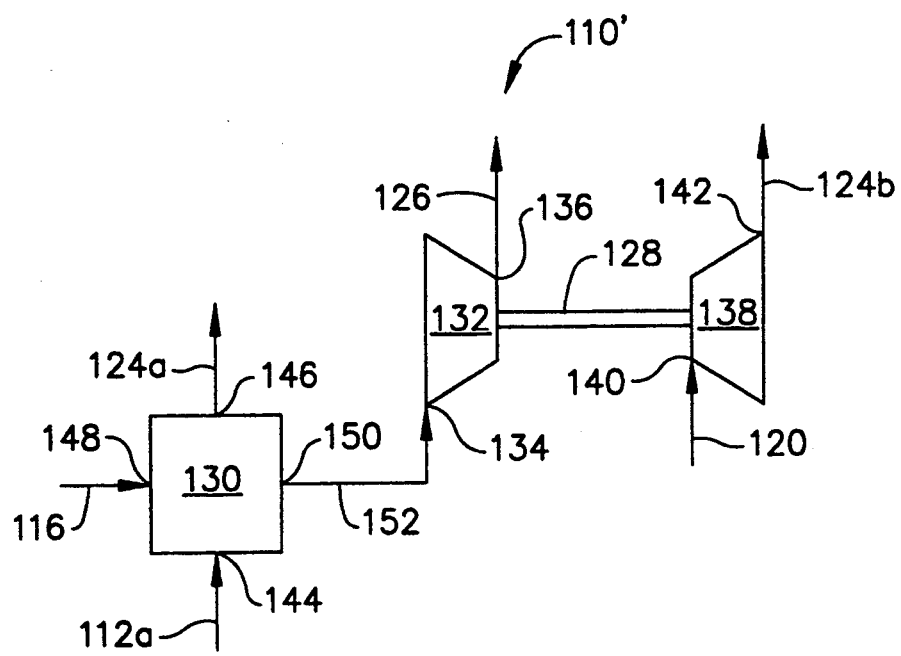
FIG. 2 is a block diagram of a the engine cooling system of FIG. 1 including a turbocompressor and a heat exchanger.

FIG. 2 shows a first embodiment 110' of the engine cooling system 110 comprising a turbocompressor 128 and a first heat exchanger 130. The turbocompressor 128 has a compressor section 132 including an inlet 134 and an outlet 136 and has a turbine section 138 including an inlet 140 and an outlet 142. Preferably the turbocompressor 128 has air bearings. The first heat exchanger 130 has an inlet 144 and an outlet 146 for a first airflow providing cooling to the first heat exchanger 130 and has an inlet 148 and an outlet 150 for a second airflow receiving cooling from the first heat exchanger 130. The first airflow inlet 144 of the first heat exchanger 130 is in fluid communication with lower pressure and temperature air (such as with a portion of the air from the low pressure compressor discharge region 114 through duct 112/112a as shown in FIGS. 1 and 2). The second airflow inlet 148 of the first heat exchanger 130 is in fluid communication with higher pressure and temperature air from the engine compressor (such as with a portion of the air from the high pressure compressor discharge region 118 through duct 116 as shown in FIGS. 1 and 2). The first airflow outlet 146 of the first heat exchanger 130 preferably is in fluid communication with the fan bypass duct 38 through duct 124a (and preferably discharges such air into the fan bypass duct 38 with an aft component of velocity). The second airflow outlet 150 of the first heat exchanger 130 is in fluid communication with the inlet 134 of the compressor section 132 of the turbocompressor 128 through duct 152. The outlet 136 of the compressor section 132 of the turbocompressor 128 is in fluid communication with the high pressure turbine 24 through duct 126 to cool at least a portion of the high pressure turbine 24. The inlet 140 of the turbine section 138 of the turbocompressor 128 is in fluid communication with intermediate pressure and temperature air from the engine compressor (such as with a portion of the air from the eighth stage high pressure compressor region 122 through duct 120 as shown in FIGS. 1 and 2). As can be appreciated by those skilled in the art, the higher pressure and temperature air has a higher pressure and temperature than that of the lower pressure and temperature air, and the intermediate pressure and temperature air has a pressure and temperature intermediate that of the lower pressure and temperature air and the higher pressure and temperature air. It is understood that the term "pressure" means total pressure (i.e., static pressure plus dynamic pressure). The outlet 142 of the turbine section 138 of the turbocompressor 128 preferably is in fluid communication with the fan bypass duct 38 through duct 124b (and preferably discharges such air into the fan bypass duct 38 with an aft component of velocity).

Figure 3:
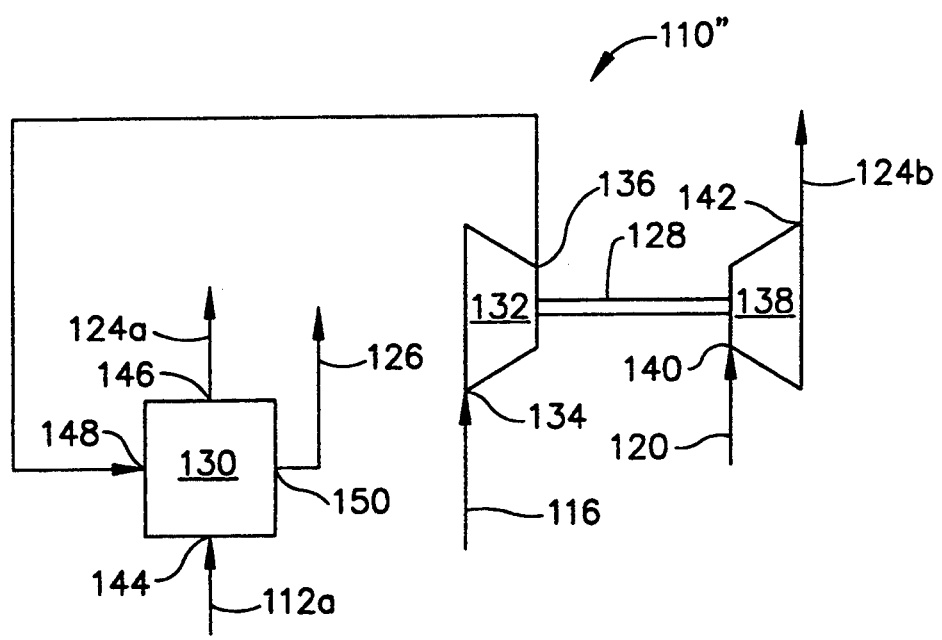
FIG. 3 is a block diagram of an alternate embodiment of the engine cooling system of FIG. 2.

FIG. 3 shows a second embodiment 110" of the engine cooling system 110 which is identical to the first embodiment 110' of FIG. 2 previously discussed, but with three differences. First, the second airflow outlet 150 of the first heat exchanger 130 is in fluid communication with the high pressure turbine 24 through duct 126 to cool at least a portion of the high pressure turbine 24. Second, the inlet 134 of the compressor section 132 of the turbocompressor 128 is in fluid communication with higher pressure and temperature air from the engine compressor (such as with a portion of the air from the high pressure compressor discharge region 118 through duct 116 as shown in FIGS. 1 and 3). Third, the outlet 136 of the compressor section 132 of the turbocompressor 128 is in fluid communication with the second airflow inlet 148 of the first heat exchanger 130.

Figure 4:
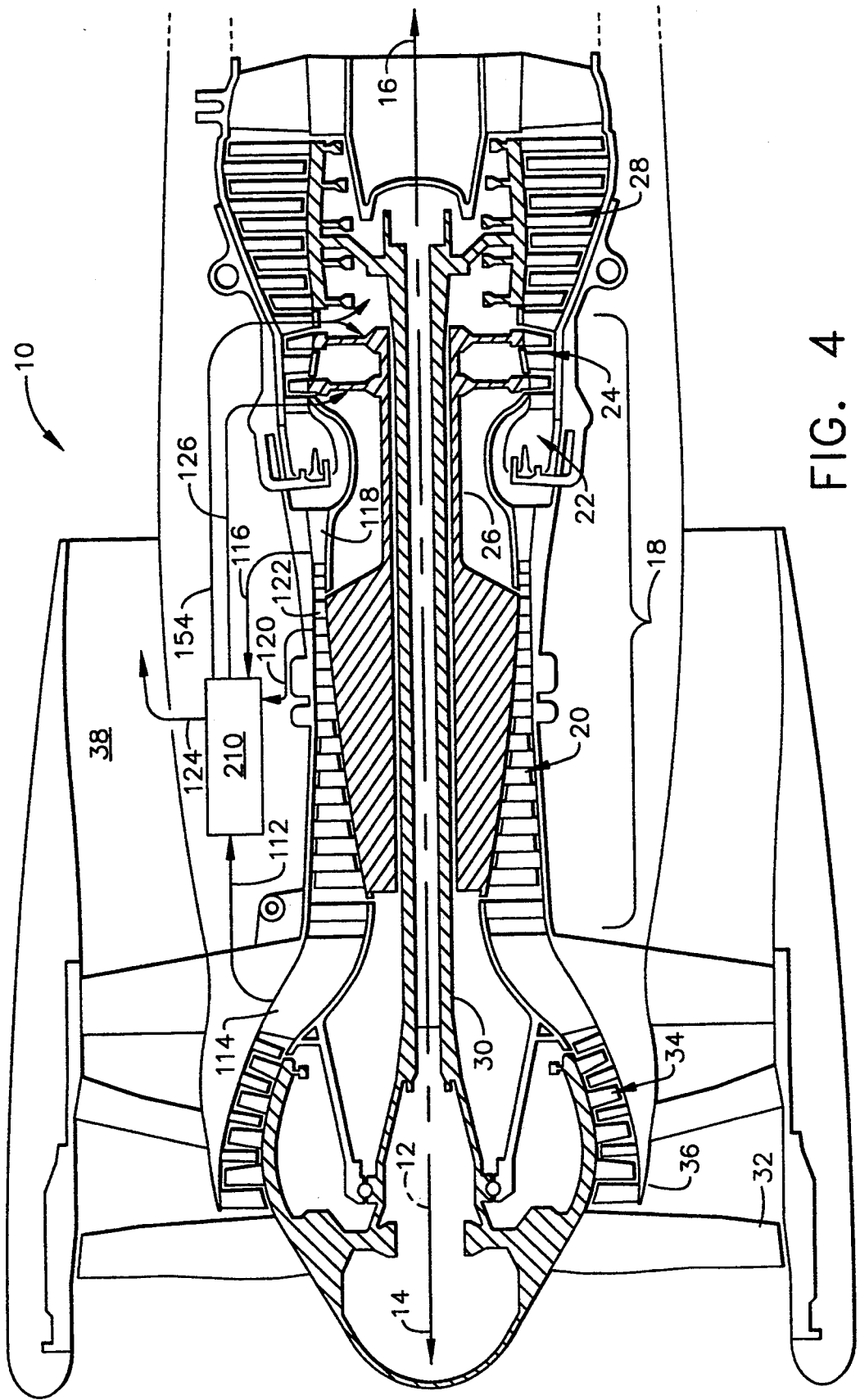
FIG. 4 is a schematic side view of an aircraft bypass turbofan gas turbine engine (with the exhaust nozzle omitted for clarity) which employs the engine cooling system of the invention to cool both a high pressure turbine portion and a low pressure turbine portion of the engine.

FIG. 4 shows a second application of the engine cooling system 210 of the invention used for cooling a first portion of the engine 10, wherein the first portion comprises the high pressure turbine 24 and also for cooling a second portion of the engine 10, wherein the second portion comprises the low pressure turbine 28. The cooling system 210 as shown in FIG. 4 is identical to the first application's cooling system 110, as shown in FIG. 1, but with one addition. The cooling system 210 also discharges air to a duct 154 which routes air to the low pressure turbine 28 region.

Figure 5:
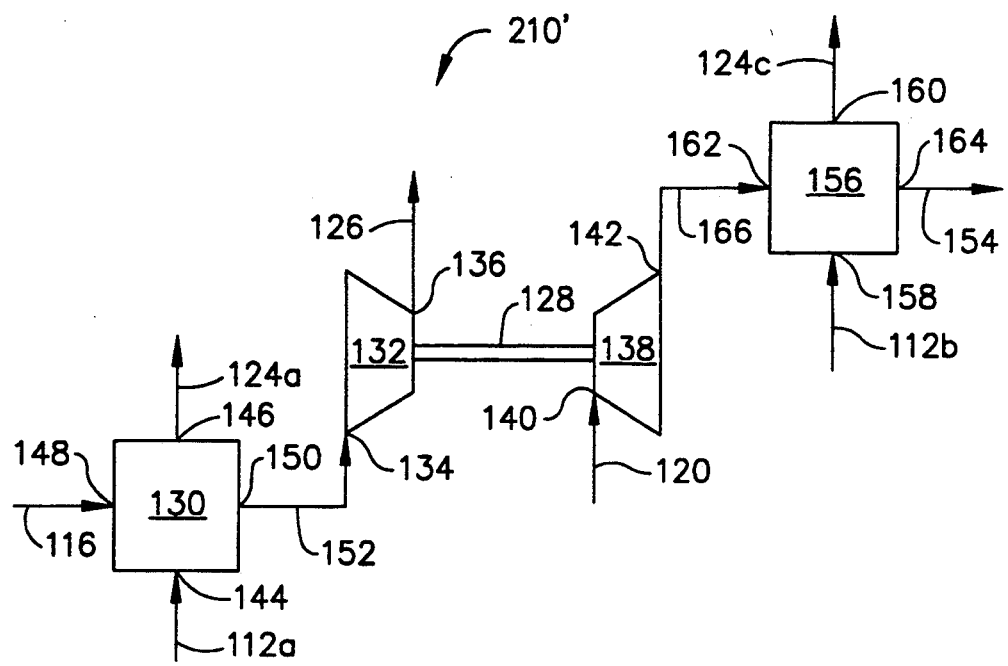
FIG. 5 is a block diagram of a the engine cooling system of FIG. 4 including a turbocompressor and two heat exchangers.

FIG. 5 shows a first embodiment 210' of the engine cooling system 210 which is identical to the first embodiment 110' of the engine cooling system 110 of FIG. 2 previously discussed, but with one addition and one difference. Briefly, the addition is a second heat exchanger 156, and the difference is in the duct which is in fluid communication with the outlet 142 of the turbine section 138 of the turbocompressor 128. More particularly, the second heat exchanger 156 has an inlet 158 and an outlet 160 for a third airflow providing cooling to the second heat exchanger 156 and has an inlet 162 and an outlet 164 for a fourth airflow receiving cooling from the second heat exchanger 156. The first airflow inlet 158 of the second heat exchanger 156 is in fluid communication with lower pressure and temperature air (such as with a portion of the air from the low pressure compressor discharge region 114 through duct 112/112b as shown in FIGS. 4 and 5). The second airflow inlet 162 of the second heat exchanger 156 is in fluid communication with the outlet 142 of the turbine section 138 of the turbocompressor 128 through duct 166. The first airflow outlet 160 of the second heat exchanger 156 preferably is in fluid communication with the fan bypass duct 38 through duct 124c (and preferably discharges such air into the fan bypass duct 38 with an aft component of velocity). The second airflow outlet 164 of the second heat exchanger 156 is in fluid communication with the low pressure turbine 28 through duct 154 to cool at least a portion of the low pressure turbine 28.

Figure 6:
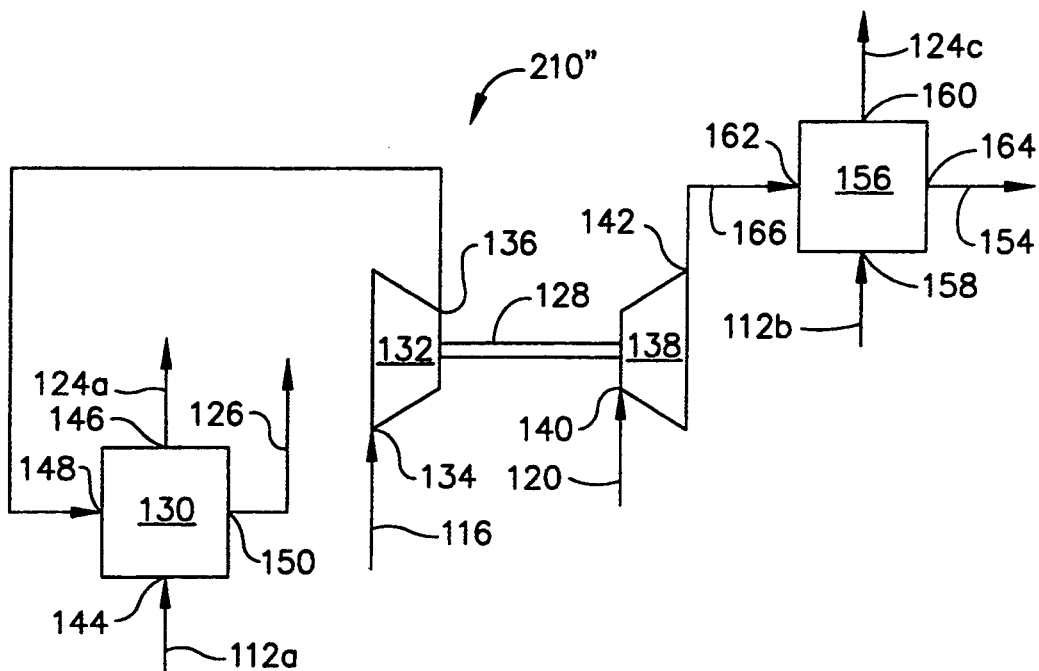
FIG. 6 is a block diagram of an alternate embodiment of the engine cooling system of FIG. 5.

FIG. 6 shows a second embodiment 210" of the engine cooling system 210 which is identical to the second embodiment 110" of FIG. 3, but with the one addition (the second heat exchanger 156) and the one difference (the duct which provides fluid communication from the outlet 142 of the turbine section 138 of the turbocompressor 128) as previously discussed.

Figure 7:
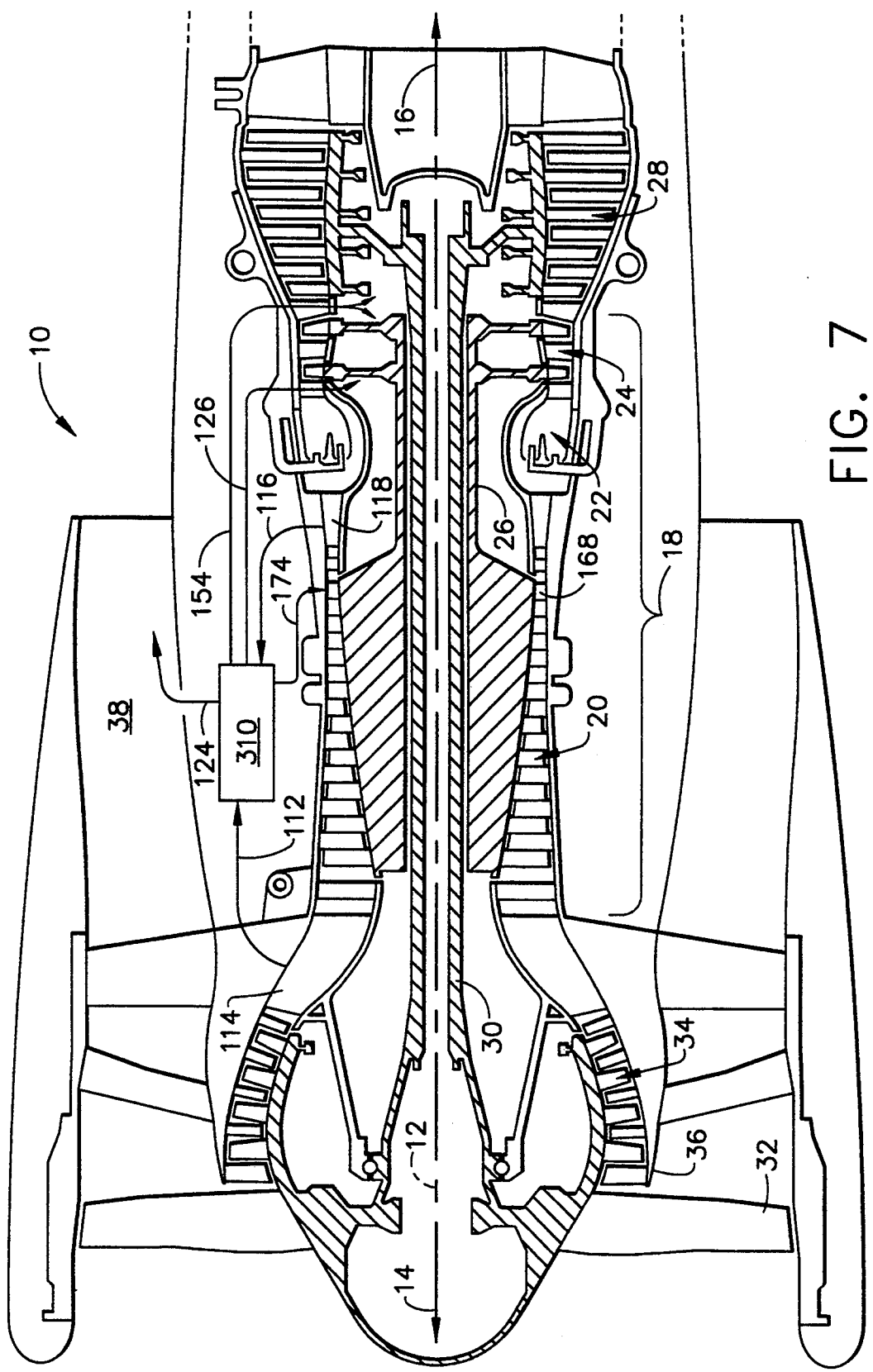
FIG. 7 is a schematic side view of an aircraft bypass turbofan gas turbine engine (with the exhaust nozzle omitted for clarity) which employs a preferred embodiment of the cooling system of the invention which uses a single heat exchanger to cool both a high pressure turbine portion and a low pressure turbine portion of the engine as well as an aft portion of the high pressure compressor.
Figure 8:
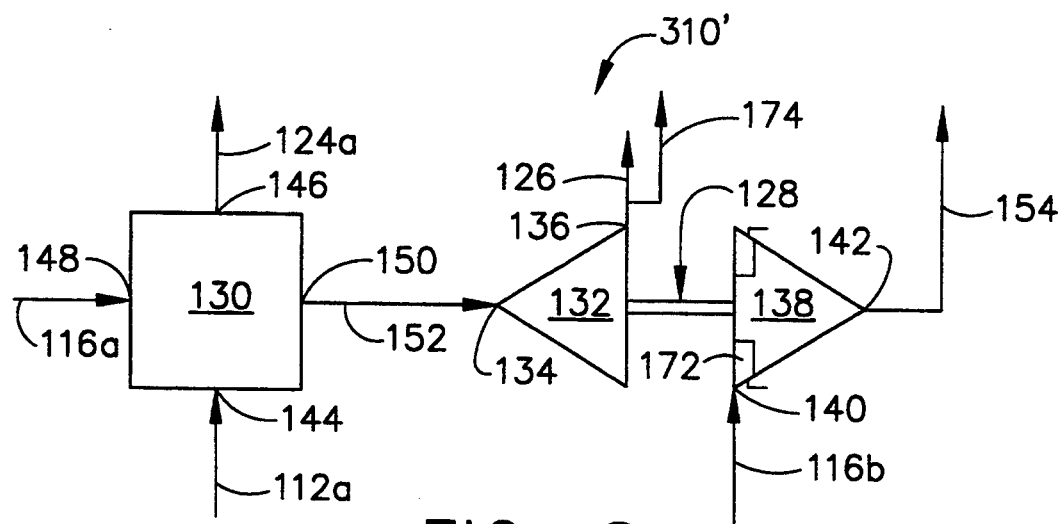
FIG. 8 is a block diagram of the engine cooling system of FIG. 7 including a turbocompressor and a single (first) heat exchanger.
Figure 9:
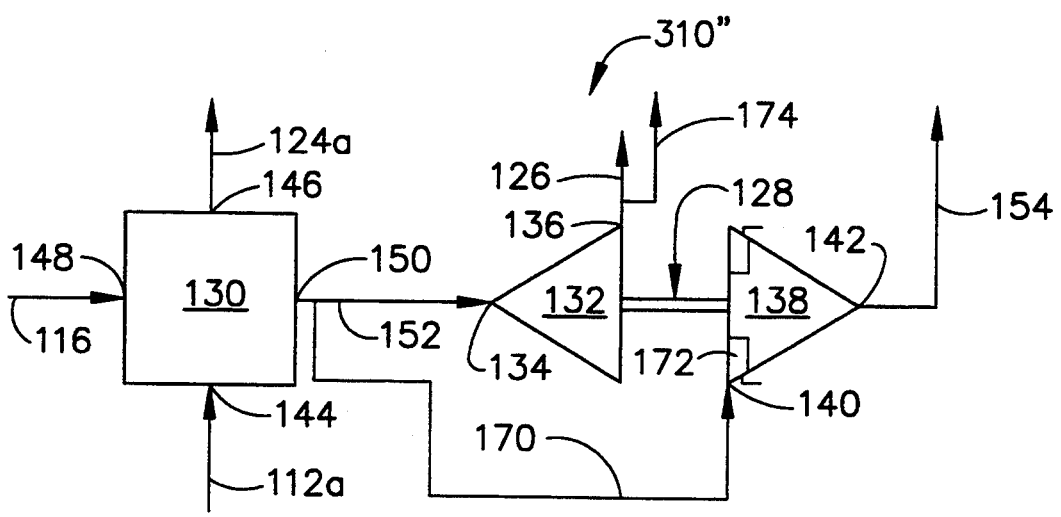
FIG. 9 is a block diagram of an alternate embodiment of the engine cooling system of FIG. 8.

In a preferred embodiment of the engine cooling system 310 of the invention, shown in FIGS. 7–10, a single (first) heat exchanger 130 is used to cool both the high pressure turbine 24 portion and the low pressure turbine 28 portion of the engine 10 as well as the aft portion 168 of the high pressure compressor 20. The turbine section 138 of the turbocompressor 128 has its inlet 140 in fluid communication with either: (1) the higher temperature air from the engine compressor, such as a portion of discharge air from the high pressure compressor discharge region 118 (via duct 116b as seen in a first configuration 310' in FIG. 8 of the engine cooling system 310 of FIG. 7) or (2) the second airflow outlet 150 of the first heat exchanger 130 (via duct 170 as seen in a second configuration 310" in FIG. 9 of the engine cooling system 310 of FIG. 7) instead of being in fluid communication with the intermediate pressure and temperature air region 122. In either configuration, as shown in FIGS. 8 and 9, the turbine section 138 of the turbocompressor 128 is driven with higher pressure air. Preferably, the outlet 142 of the turbine section 138 of the turbocompressor 128 is in fluid communication with the engine low pressure turbine 28 via duct 154 instead of being in fluid communication (via duct 124b) with the fan bypass duct 38. This preferred embodiment cools both the high and low pressure turbines 24 and 28 of the engine 10 with the use of a single heat exchanger 130 employed in either of the configurations shown in FIGS. 8 and 9.

FIGS. 7–9 show the inlet 144 of the first heat exchanger 130 to be connected to the duct 112a from the low pressure compressor discharge region 114 and show the outlet 146 of the first heat exchanger 130 to be connected to duct 124a leading to the fan bypass duct 38. However, for a turboshaft type of gas turbine engine (not shown) used to drive an electric power generator, a preferred arrangement includes the inlet 144 being in fluid communication with (for example) natural gas engine fuel downstream of the fuel controller and includes fuel exiting the outlet 146 to be injected into the combustor portion of the engine.

For certain applications, the turbine section 138 of the turbocompressor 128 of the preferred embodiment discussed above includes a row of variable area nozzle vanes 172 which may be controlled by the engine controller (not shown). As can be appreciated by those skilled in the art, controllably varying the area of the nozzle vanes 172 will vary the flow of cooling air to better match the cooling needs (which vary during flight) of those portions of the engine being cooled.

Figure 10:
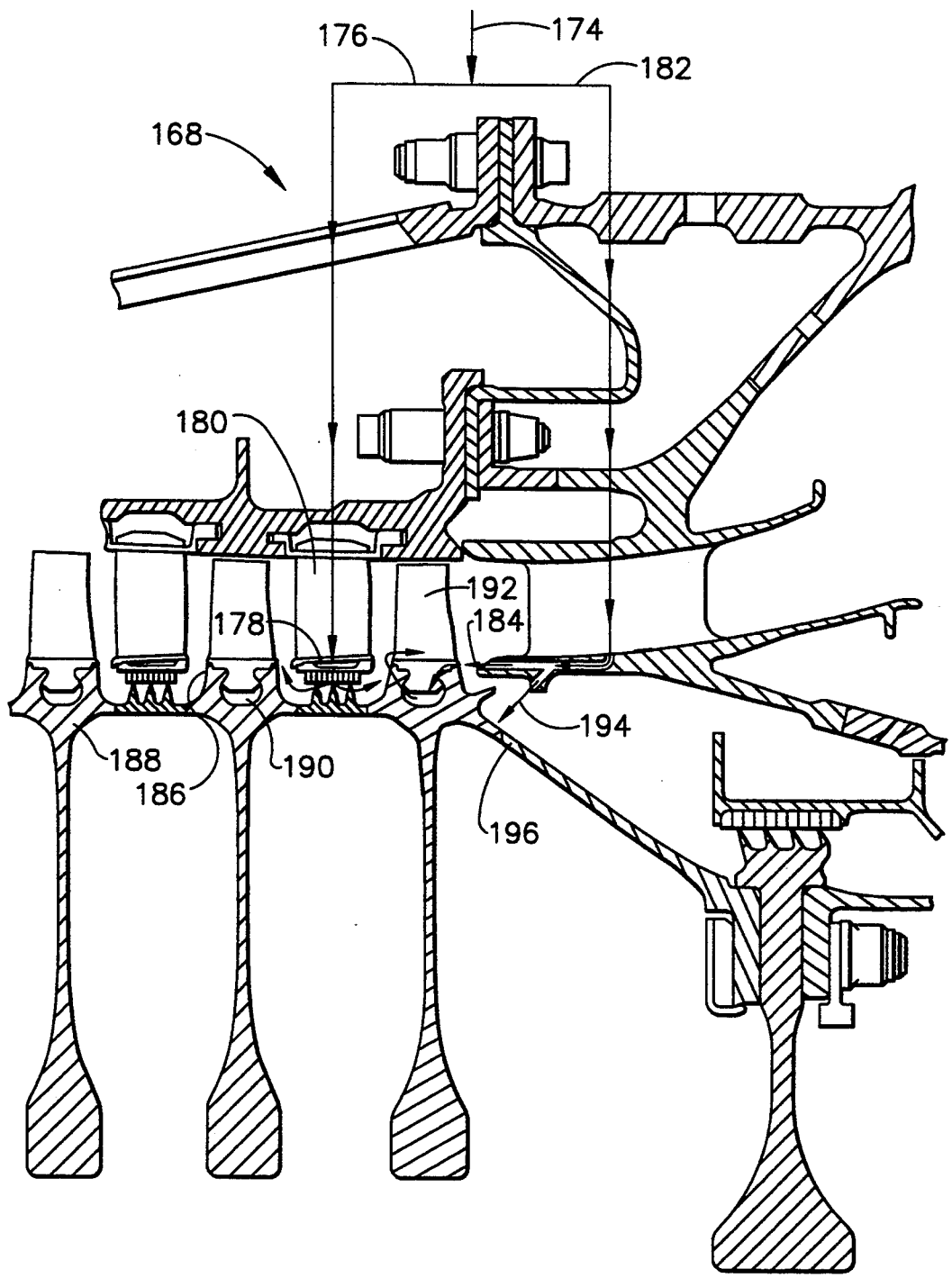
FIG. 10 is a schematic side view of a portion of the engine of FIG. 7 which includes an aft portion of the high pressure compressor.

For added cooling benefit in the preferred embodiment discussed above, the outlet 136 of the compressor section 132 of the turbocompressor 128 is also in fluid communication with the aft portion 168 of the high pressure compressor 20 via duct 174. As seen in FIG. 10, duct 174 directs some cooling air through a first path (denoted by 176) which is in fluid communication with the stator seals 178 of the aft-most row of high pressure compressor (hollow) stators 180. Duct 174 also directs some cooling air through a second path (denoted by 182) which includes a first branch 184 which is in fluid communication with the forward sides 186 of the disc rims 188 (via the dovetail slots 190) of the aft-most row of high pressure compressor blades 192. The second path 182 includes a second branch 194 which is in fluid communication with the high pressure turbine shaft 196 proximate its connection to the aft portion 168 of the high pressure compressor 20. The paths 176 and 182 and branches 184 and 194 are provided by designing various engine casing holes, various ducts, and various hollow stators and diffusers so as to create such coolant pathways, the detail design being within the skill of the artisan. For example, air jets cooling the high pressure turbine shaft 196 could be aligned in the direction of shaft rotation to improve film effectiveness or could be aligned normal to the shaft to improve heat transfer.

Conventional engine cooling techniques duct compressor air directly to the high pressure turbine 24 region and the low pressure turbine 28 region of the engine 10. The cooling system of the invention can be used to augment such conventional engine cooling techniques or it can be used to substitute for such conventional techniques.

The operation of the first embodiment 210' of the engine cooling system 210 is typical of the other embodiments, and will be described with reference to a numerical example based on engineering analysis where the pressure P is measured in psia and the temperature T is measured in degrees R. Referring to FIGS. 4 and 5, it is seen that air (P=34.8, T=810) from the low pressure compressor discharge region 114 is carried by duct 112a to the first heat exchanger 130 to cool air (P=497, T=1689) from the high pressure compressor discharge region 118 carried by duct 116 entering the first heat exchanger 130 so that the airflow receiving cooling will exit the first heat exchanger 130 as air (P=462, T=1369) carried by duct 152 to the compressor section 132 of the turbocompressor 128. The compressor section 132 is driven by the turbine section 138 from air (P=277, T=1486) from the intermediate compressor region 122 carried by duct 120. Air (P=497, T=1416) leaves the compressor section 132 of the turbocompressor 128 in duct 126 to cool the high pressure turbine 24. (Conventional cooling of the high pressure turbine directly with air from the high pressure compressor discharge region would deliver such air at P=464 and T=1647.) In a similar fashion, air (P=140, T=1109) leaves the second heat exchanger 156 in duct 154 to cool the low pressure turbine 28. (Conventional cooling of the low pressure turbine directly with air from the intermediate compressor region would deliver such air at P=130 and T=1186.) The greater engine cooling capacity of the system of the invention achieves a net thrust of 51878 pounds compared with 45139 pounds of net thrust using conventional cooling (with the high temperature turbine blade temperature at a "redline" limit of 1838 for both the cooling system of the invention and the conventional cooling). The improvement in net thrust for the engine cooling system of the invention is nearly fifteen percent.

The foregoing description of several embodiments of the invention has been presented for purposes of illustration. It is not intended to be exhaustive or to limit the invention to the precise form disclosed, and obviously many modifications and variations are possible in light of the above teachings. For example, it is understood that the phrase "engine compressor" includes any low, intermediate, and/or high pressure engine compressor. Also, various portions of the engine which may be cooled by the engine cooling system of the invention include those portions involving high pressure turbine cooling, low pressure turbine cooling, combustor cooling, compressor disc cooling, compressor discharge cooling, compressor and turbine case cooling, clearance control cooling, etc. Additionally, lower pressure and temperature air may be bled or ducted from the fan region, the fan bypass region, etc. as well as from the low pressure compressor region. Further, the invention is applicable to gas turbine engines having axial, radial, or other types of gas turbine engine compressors and/or turbines. It is likewise understood that in some applications, the engine cooling system of the invention may employ valves to control the airflow in the various ducts, and/or the engine cooling system of the invention may be employed in those engines having variable turbine nozzles where greater cooling is required when the turbine nozzle area is reduced. It is noted that the first airflow can be generalized as a first fluid flow having a higher temperature than that of the second airflow, and that such first fluid flow can be engine fuel wherein, for example, duct 112 would convey some fuel from the fuel tank to the heat exchanger(s) and duct 124 would convey the fuel from the heat exchanger(s) back to the fuel tank or to the combustor, etc. (such arrangement not shown in the drawings). Such modifications and variations, and other modifications and variations, are all within the scope of the claims appended hereto.

I claim:

1. A system for cooling first and second portions of a gas turbine engine, said engine having an engine compressor, and said cooling system comprising:
   (a) a turbocompressor having a compressor section and a turbine section each with an inlet and an outlet; and
   (b) a first heat exchanger having an inlet and an outlet for a first fluid flow providing cooling to said first heat exchanger and having an inlet and an outlet for a second airflow receiving cooling from said first heat exchanger, said first fluid flow inlet of said first heat exchanger in fluid communication with lower temperature fluid, said second airflow inlet of said first heat exchanger in fluid communication with higher temperature air from said engine compressor, said second airflow outlet of said first heat exchanger in fluid communication with said inlet of said compressor section of said turbocompressor, and said outlet of said compressor section of said turbocompressor in fluid communication with said first portion of said engine and said outlet of said turbine section of said turbocompressor in fluid communication with said second portion of said engine for said cooling of said first and second portions of said engine and wherein said higher temperature air has a higher temperature than that of said lower temperature fluid.

2. The cooling system of claim 1, wherein said inlet of said turbine section of said turbocompressor is in fluid communication with said higher temperature air from said engine compressor.

3. The cooling system of claim 1, wherein said second airflow outlet of said first heat exchanger is in fluid communication with said inlet of said turbine section of said turbocompressor.

4. The cooling system of claim 1, wherein said inlet of said turbine section of said turbocompressor includes a row of variable area nozzle vanes.

5. The cooling system of claim 1, wherein said engine compressor includes a high pressure compressor and said higher temperature air includes a portion of discharge air from said high pressure compressor.

6. The cooling system of claim 5, wherein said engine has an engine turbine including a high pressure turbine and a low pressure turbine and wherein said first portion of said engine includes said high pressure turbine and said second portion of said engine includes said low pressure turbine.

7. The cooling system of claim 6, wherein said outlet of said compressor section of said turbocompressor is also in fluid communication with an aft portion of said high pressure compressor.

8. The cooling system of claim 7, wherein said aft portion of said high pressure compressor includes an aft-most row of stators having stator seals and wherein said outlet of said compressor section of said turbocompressor is in fluid communication with said stator seals.

9. The cooling system of claim 7, wherein said aft portion of said high pressure compressor includes an aft-most row of blades having dovetail slots and disc rims with forward sides and wherein said outlet of said compressor section of said turbocompressor is in fluid communication with said forward sides of said disc rims via said dovetail slots.

10. The cooling system of claim 7, wherein said high pressure turbine includes a shaft connected to said aft portion of said high pressure compressor and wherein said outlet of said compressor section of said turbocompressor is in fluid communication with said shaft proximate said aft portion of said high pressure compressor.

* * * * *